United States Patent

Stanfield

[11] Patent Number: 5,897,323
[45] Date of Patent: Apr. 27, 1999

[54] SHOELACE TYING HELPER

[76] Inventor: James S. Stanfield, P.O. Box 41058, Santa Barbara, Calif. 93140

[21] Appl. No.: 08/349,426

[22] Filed: Dec. 5, 1994

Related U.S. Application Data

[63] Continuation-in-part of application No. 08/058,450, May 7, 1993, Pat. No. 5,372,510.

[51] Int. Cl.⁶ .................................................. G09B 19/24
[52] U.S. Cl. .......................................................... 434/260
[58] Field of Search ................................... 434/260, 258, 434/247

[56] References Cited

U.S. PATENT DOCUMENTS

| | | | |
|---|---|---|---|
| D. 143,237 | 7/1945 | Pares | 434/260 X |
| 1,853,790 | 4/1932 | Wescott | 434/260 |
| 2,385,197 | 4/1945 | Eisel | 434/260 |
| 2,527,242 | 10/1950 | Clark | 434/260 |
| 2,646,630 | 7/1953 | Miller | 434/260 |
| 4,017,984 | 4/1977 | Bonfigli | 434/260 |
| 4,721,468 | 1/1988 | Alexander | 434/260 |
| 5,110,296 | 5/1992 | Cohen | 434/260 |
| 5,240,418 | 8/1993 | Silverman et al. | 434/260 |
| 5,372,510 | 12/1994 | Stanfield | 434/260 |

*Primary Examiner*—Jeffrey A. Smith
*Attorney, Agent, or Firm*—Freilich Hornbaker Rosen

[57] ABSTRACT

A combination of a shoe device (12, FIG. 4) and shoelace (14) for use by young children and the handicapped to learn to tie a shoelace bow, is of simple construction and provides simple guidance. The shoe device is in the form of a plate of cardboard or the like, with markings thereon that represent the shape and position of a shoelace loop, so a child can bend an end of the shoelace to correspond to the markings. A holdown is provided along the marking to hold the looped shoelace in position. The holdown can be formed by a cut in the plate which forms a tab with a free end. The plate has greater similarity to a shoe by forming the front portion of the plate with a perimeter that is cut out in the shape of the front half of a child's shoe, with a rounded front end and substantially parallel sides, and with the plate being decorated, or marked, to represent the front of a shoe.

7 Claims, 1 Drawing Sheet

U.S. Patent  Apr. 27, 1999  5,897,323
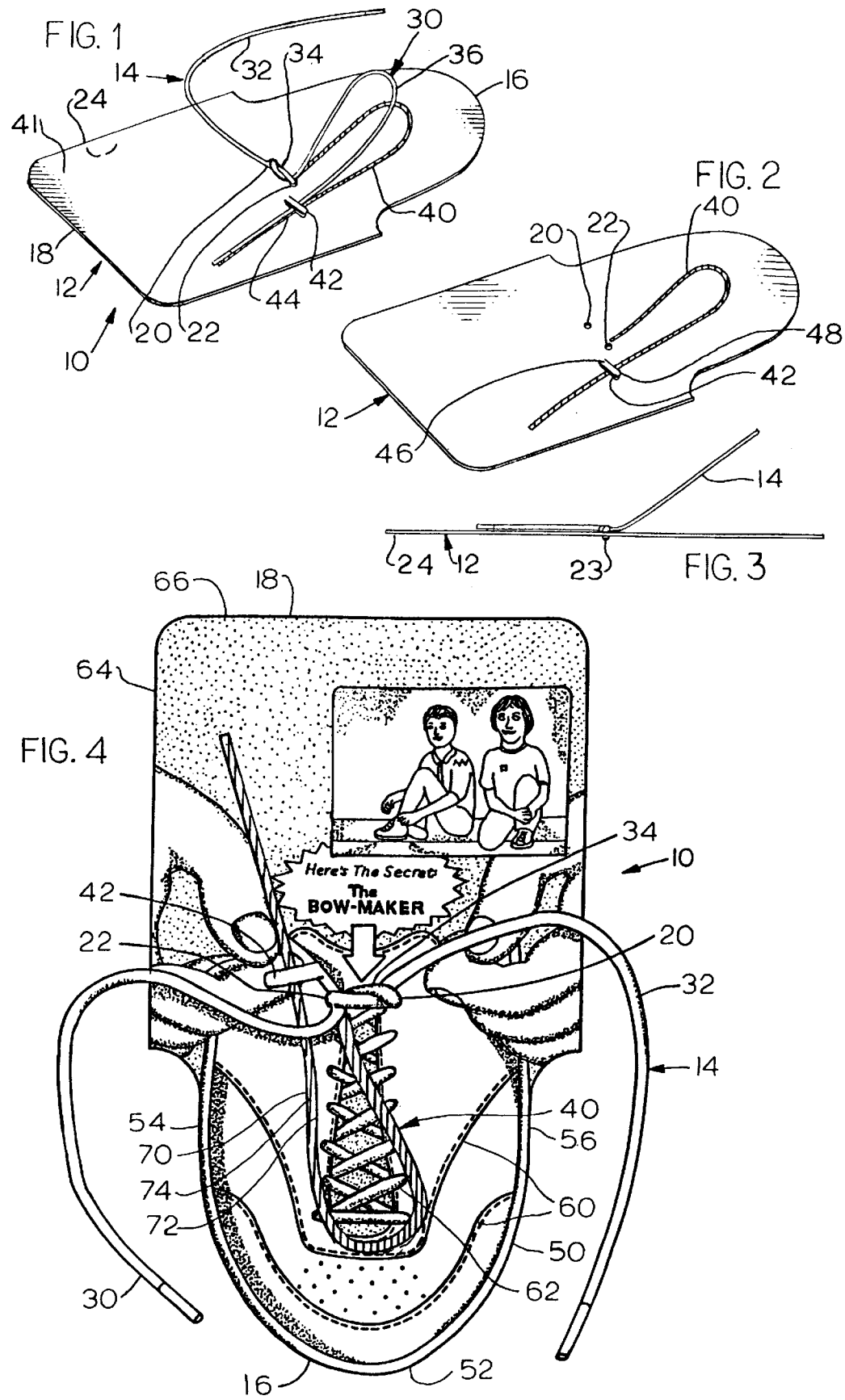

SHOELACE TYING HELPER

CROSS REFERENCE

This is a continuation-in-part of U.S. patent application Ser. No. 08/058,450 filed May 7, 1993 (now U.S. Pat. No. 5,372,510).

BACKGROUND OF THE INVENTION

Young children and retarded persons often experience great difficulty in tying their shoelaces into bows. One difficulty encountered by such persons is determining how a first end of the shoelace should be bent to form a loop and where the loop should be placed. Also, such persons often find difficulty in holding the looped first end portion, while manipulating the other end portion so as to form a second loop and wrap and thread the loops to form a bow.

One type of teaching aid which can be economically produced and displayed, includes a plate of material such as cardboard, with markings representing at least part of a shoe, and with holes through which a shoelace can be threaded. It would be desirable if such aid could be made as realistic as possible, without substantial increase in its cost.

SUMMARY OF THE INVENTION

In accordance with one embodiment of the present invention, a low cost and easily understood aid is provided to help children or retarded persons in bending a shoelace end into a loop and in keeping it in that shape and position, while the person manipulates a second end of the shoelace in the tying of a bow. The shoe device includes a marking that represents the shape and position of the shoelace loop, so a person can bend the first shoelace end and then place it substantially over the marking. The shoe device also has a holdown for holding an end of the loop, to maintain its shape and position while the person manipulates the second end of the shoelace. The marking can be a line on the upper surface of a plate of material such as cardboard, while the holdown can be a tab that is cut into the plate and that has an inner end still attached to the rest of the plate.

Greater realism for the shoe device is achieved at negligible cost and even at some savings, by cutting a front portion of a plate to represent the front half of a child's shoe. The front portion is cut out to form a rounded front and largely parallel sides. The front portion also has decorations, or markings, representing the front portion of a child's shoe.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified isometric view of the shoe device and of a shoelace thereon, with one end of the shoelace lying largely on a loop marking of the shoe device.

FIG. 2 is an isometric view similar to that of FIG. 1, but without the shoelace thereon.

FIG. 3 is a side edge view of the combination of FIG. 1.

FIG. 4 is a detailed plan view of the shoe device and shoelace of FIG. 1.

DESCRIPTION OF THE PREFERRED EMBODIMENTS

FIG. 1 illustrates a combination 10 of a shoe device 12 and shoelace 14, which is useful to help young children and retarded persons tie a shoelace bow. The shoe device is formed by a piece of cardboard having front and rear end portions 16, 18, and having holes 20, 22 through which the ends of a shoelace can project, the holes forming a shoelace mount. Applicant prefers to use a short shoelace with a middle 23 of about one inch length which lies against a lower face 24 of the shoe device, but whose opposite ends 30, 32 are of sufficient length (e.g. ten inches) to enable a child or retarded person to easily tie a shoelace bow.

A common shoelace tying technique involves forming a single interlacement 34 of the shoelace end portions, followed by the forming of a loop 36 in the first shoelace end portion 30. Then a second loop may be formed in the second shoelace end portion 32, and the loops are wrapped and threaded one through the other to form a bow. A troublesome step to children and retarded persons in tying a bow is in forming the loop 36 so it is of proper size (about 3 inches long) and is properly placed, and in maintaining the loop intact while forming a second loop in the second end of the shoelace and wrapping and threaded the loops. There are many approaches, including providing VELCRO (hook and loop fasteners) strips on different sides of the first shoelace and providing clasps to hold opposite sides of the loop together. The prior approaches maintain the loop shape but not the loop position, do not instruct the person as to where to place the loop, and add substantial bulk and cost.

In accordance with the present invention, applicant provides the shoe device with a marking 40 on its upper face 41, that represents the proper shape and position of the shoelace loop 36. The marking 40 includes at least one line which extends along the marked looped path taken by the proper loop 36. It can be seen that the marking 40 (FIG. 2) includes a line extending along a loop that is elongated rather than circular. Applicant also provides a holdown 42 lying along the marking or slightly beyond it, which holds a location 44 along the shoelace loop 36 to the shoe device, to fix the position of the loop. The shoe device 12 is preferable formed by a sheet or plate of material such as cardboard, and the holdown 42 can be formed by punching a tab out of the cardboard, with an inner end 46 of the tab left connected to the rest of the plate while the other end 48 is a free end. A person forms the loop and slides the location 44 under the tab at 42. The tab at 42 provides only small holding power, but that is generally all that is required to prevent a flexible shoelace from unflexing out of a loop configuration and to hold it in place, since the other end of the loop is maintained in position at the interlacement 34. The shoelace 14 provided with the shoe device, is preferably fairly stiff, so it can hold its upwardly-extended orientation (which further helps in tying a bow) when the holdown 42 holds down the location 42.

Applicant prefers to provide the combination 10 of shoe device 12 and short shoelace 14 as a unit. However, since the shoelace is held only by threading through holes, is possible for a parent to replace the shoelace with a full length one. This can be useful where the parent wishes to provide a highly decorative shoelace for practice tying by a child, with the shoelace later being installed on the child's shoe. The child can be easily taught to make the interlacement 34. The child is taught that he/she should form a loop 36, with the size and placement of the loop such as to follow the marking 40, although it need not be very close to the marking, and preferably bent to extend at an upward incline. Also, the child is taught to place a location 44 along the shoelace end under the holdown 42. Other instructions teach the child how to form a loop at the second end 32 of the shoelace and how to thread the looped ends together. Since the child can continually hold the second end 32 while forming a loop and threading it, it is generally not as important to indicate how to form the second loop. My earlier patent 4,721,468 shows ways for progressing with the tying of a bow after forming the first loop 36.

FIG. 4 is a more detailed plan view of the combination of FIGS. 1–3. It can be seen that the front portion 16 of the shoe device is cutout to represent the front half of a child's shoe. That is, the perimeter 50 of the front portion includes a rounded front 52 and largely parallel sides 54, 56 lying rearward of the rounded front 52. The front portion 16 has shoe markings 60 representing the front portion of a shoe. The combination of the cutout perimeter 50 and shoe markings 60 create a more realistic representation of a shoe than only shoe markings. Such enhanced realism makes the shoe device more attractive to a parent who buys it than to a child who will use it to learn to tie the similar-appearing child's shoe. In fact, where markings representing the front of a shoe are used, the use of a cutout perimeter 50 avoids the need for a longer shoe device. Since applicant provides a short shoelace, he prefers the shoe markings to include a shoe marking 62 representing a long laced shoelace middle, that is, the laced middle of a shoelace. The combination of such lace markings and a short shoelace create the appearance of a laced long shoelace. It is possible for applicant to provide only the shoe device, although he generally prefers to provide a short shoelace with the shoe device. Applicant prefers to form the shoelace device with a largely rectangular rear 64 having a substantially straight rear end 66 to help in packaging the device.

The marking 40 that represents the preferred position and general position of the loop (the loop preferably lies at an upward incline over the marking), includes two lines 70, 72 and a red color indicated at 74 between the lines. The first end 30 of the shoelace is preferably also colored red, to avoid confusion as to which shoelace end to lay along the loop marking. The second end portion 32 has a different color than that of the first end portion 36.

Thus, applicant provides a shoe device useful with a shoelace or a combination of them, which is of low cost and considerable realism, that facilitates the tying of a shoelace bow by young children or the handicapped. The shoe device includes a marking which represents the shape and position of a shoelace loop, and which preferably includes at least one line (which may be interrupted) following the shape and position of the desired loop. The shoe device preferably has a holdown lying along the marking or just beyond it, which holds a location along the shoelace loop in position on the shoe device. The holdown can be formed by a tab cut into a plate that forms the shoe device. Where the shoe device is formed of a plate, the front portion of the plate can have a perimeter cut out in the shape of the front half of a child's shoe (as seen in a plan view thereof), with the perimeter of the front portion having a rounded front and substantially parallel sides lying rearward thereof. The upper surface of the plate is marked along the front portion to represent the front of a shoe.

Although particular embodiments of the invention have been described and illustrated herein, it is recognized that modifications and variations may readily occur to those skilled in the art, and consequently, it is intended that the claims be interpreted to cover such modifications and equivalents.

What is claimed:

1. A shoe device and shoelace combination, comprising:
   a plate which has front and rear ends and upper and lower surfaces, said plate having a front portion with a cut out perimeter, with the perimeter of said front portion having a rounded front and largely parallel sides lying rearward of said rounded front to represent the outline of the front of a child's shoe as seen in a plan view, and said upper surface of said plate being marked along said front portion to represent the front of a shoe;
   a shoelace mounted on said plate and having shoelace ends projecting from first and second locations on said plate, where said locations lie at substantially the rear of said front half of a shoe.

2. The combination described in claim 1 wherein:
   said upper surface of said plate has a line marked thereon which extends in an elongated marked loop to indicate the shape and position of a shoelace loop that one of said shoelace ends can be bent into, and onto which the shoelace loop can be placed, to begin the tying of a bow.

3. The combination described in claim 2 wherein:
   said plate has a cutout forming a tab lying along said line to hold down a location along said shoelace loop to said plate.

4. Apparatus for use with a shoelace to teach young children and the handicapped to tie a shoelace bow, comprising:
   a shoe device which is largely in the form of a plate with upper and lower surfaces and with shoe markings representing a shoe, said shoe device having a shoelace mount for holding a shoelace, and said shoe device having a marking on said upper surface which represents the shape of a loop to which a shoelace end can be bent in the tying of a bow, and said shoe device having a holdown which can press a location along a shoelace which has been laid on said marking, against said upper surface.

5. The apparatus described in claim 4 wherein:
   said marking comprises a marked line with a portion in the form of an elongated loop having a length of about three inches extending from said shoelace mount, to indicate the shape and position of a shoelace end bent into a shoelace loop to tie a bow.

6. The apparatus described in claim 4 wherein:
   said plate has a front portion with a perimeter cut out in the shape of the front half of a child's shoe with a rounded front end and largely parallel sides.

7. A shoe device and shoelace combination for use by young children of the handicapped, which includes a shoelace having first and second opposite end portions that can be tied in a bow, by first forming said first end portions into a shoelace loop, characterized by:
   said shoe device includes a marking that represents the shape and general position of said shoelace loop, to help a child or handicapped person form and position the loop, with said marking including at least one line extending along a loop that is elongated rather than circular;
   said shoe device has a holdown lying substantially along said line, which holds a location along said shoelace loop in position on said shoe device.

* * * * *